US012803035B2

(12) United States Patent
Fields

(10) Patent No.: US 12,803,035 B2
(45) Date of Patent: Nov. 17, 2026

(54) ASSEMBLY OF AN OBJECT HAVING A STACKED CONSTRUCTION OF A PLURALITY OF COMPONENTS

(71) Applicant: Cellerate Limited, Manchester (GB)

(72) Inventor: Richard Fields, Manchester (GB)

(73) Assignee: Cellerate Limited, Manchester (GB)

(*) Notice: Subject to any disclaimer, the term of this patent is extended or adjusted under 35 U.S.C. 154(b) by 457 days.

(21) Appl. No.: 18/683,723

(22) PCT Filed: Aug. 10, 2022

(86) PCT No.: PCT/GB2022/052078
§ 371 (c)(1),
(2) Date: Feb. 14, 2024

(87) PCT Pub. No.: WO2023/021271
PCT Pub. Date: Feb. 23, 2023

(65) Prior Publication Data

US 2024/0363886 A1 Oct. 31, 2024

(30) Foreign Application Priority Data

Aug. 16, 2021 (GB) .................................... 2111729

(51) Int. Cl.
*H01M 10/04* (2006.01)
*G06T 7/00* (2017.01)
*G06T 7/73* (2017.01)

(52) U.S. Cl.
CPC ......... *H01M 10/0404* (2013.01); *G06T 7/001* (2013.01); *G06T 7/74* (2017.01);
(Continued)

(58) Field of Classification Search
CPC ........................... H01M 10/0404; G06T 7/74
See application file for complete search history.

(56) References Cited

U.S. PATENT DOCUMENTS

2013/0147944 A1 6/2013 Zhang
2014/0253720 A1 9/2014 Li
(Continued)

FOREIGN PATENT DOCUMENTS

CN 210349972 U 4/2020
WO 2020129706 A1 6/2020

OTHER PUBLICATIONS

High Throughput Coin Cell Assembling System Up to 64 Cells Per Hour For Battery Research—MSK-HTBA, MTI Corp, https://www.mtixtl.com/msk-htbavideo.aspx, 2020, 1 p.
(Continued)

*Primary Examiner* — Stephan J Essex
(74) *Attorney, Agent, or Firm* — Fitch, Even, Tabin & Flannery LLP

(57) ABSTRACT

There is provided an apparatus for assembling an object having a stacked construction of a plurality of components. The apparatus comprises:
a component holder for selectively holding and placing a component;
an assembly zone in which the object may be assembled;
first and second imaging devices, the first imaging device positioned to face in an upward direction, the second imaging device positioned to face in a downward direction; and
a controller programmed to selectively coordinate the component holder and the first and second imaging devices to carry out an assembly operation for assembling components of the object in which:
the component holder holds a component over the first imaging device;
the first imaging device captures an image of the component;
the controller identifies a first reference alignment feature of the component from the image captured by the first imaging device;
the component holder places the component on top of another component in the assembly zone based on the identified first reference alignment feature of the component;
(Continued)

the second imaging device captures an overhead image of the component on top of the other component;

the controller identifies a second reference alignment feature of the component from the image captured by the second imaging device;

the controller validates a position of the component in the assembly zone based on the identified second reference alignment feature of the component.

20 Claims, 5 Drawing Sheets

(52) U.S. Cl.
CPC ... *H01M 10/0422* (2013.01); *H01M 10/0481* (2013.01); *G06T 2207/30108* (2013.01)

(56) References Cited

U.S. PATENT DOCUMENTS

2015/0201711 A1 7/2015 Jurkovic
2015/0249258 A1 9/2015 Wolf

OTHER PUBLICATIONS

Murray, V. et al, A Guide to Full Coin Cell Making for Academic Researchers, Journal of The Electrochemical Society, 166 (2) A329-A333, 2019, 6 pp.

Patent Cooperation Treaty, International Searching Authority, Notification of Transmittal of the International Search Report and the Written Opinion of the International Searching Authority, or the Declaration issued in International Application No. PCT/GB2022/052078, Nov. 7, 2022, 14 pp.

Wirth, Michael A., Ph.D., Shape Analysis & Measurement, 2004, 97 pp.

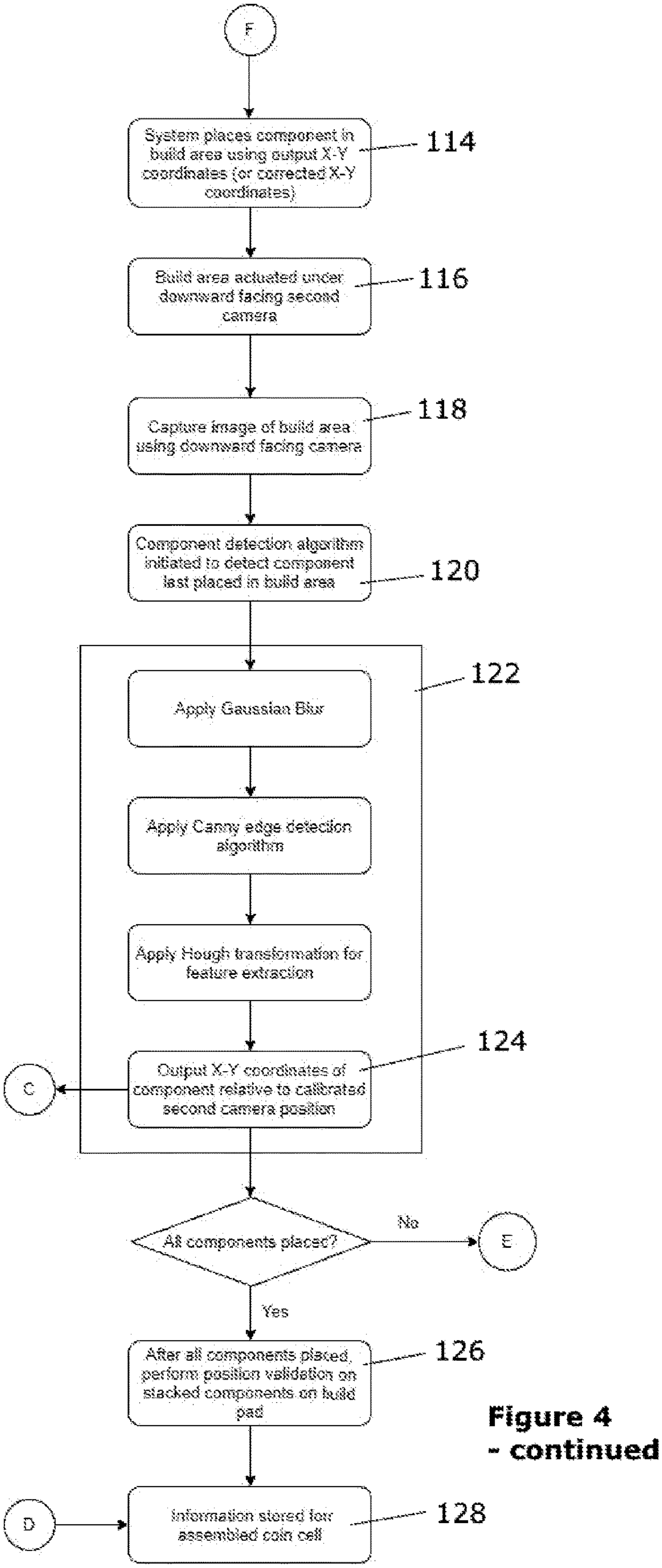
Figure 4 - continued

ASSEMBLY OF AN OBJECT HAVING A STACKED CONSTRUCTION OF A PLURALITY OF COMPONENTS

CROSS-REFERENCE TO RELATED APPLICATIONS

This application is a U.S. national phase application filed under 35 U.S.C. § 371 of International Application Number PCT/GB2022/052078, filed Aug. 10, 2022, designating the United States, which claims priority from United Kingdom Patent Application Number GB 2111729.6, filed Aug. 16, 2021, both of which are hereby incorporated by reference herein in their entireties.

FIELD

The invention relates to an apparatus for assembling an object having a stacked construction of a plurality of components and to a method of performing an assembly operation for assembling components of an object having a stacked construction of a plurality of components. This invention is preferably applicable, but not limited to, disc-shaped objects, such as disc-shaped electrochemical cells.

BACKGROUND

It is known to automate the assembly of objects, such as coin cells, which involves stacking components.

SUMMARY

According to a first aspect of the invention, there is provided an apparatus for assembling an object having a stacked construction of a plurality of components, the apparatus comprising:

- a component holder for selectively holding and placing a component;
- an assembly zone in which the object may be assembled;
- first and second imaging devices, the first imaging device positioned to face in an upward direction, the second imaging device positioned to face in a downward direction; and
- a controller programmed to selectively coordinate the component holder and the first and second imaging devices to carry out an assembly operation for assembling components of the object in which:
  - the component holder holds a component over the first imaging device;
  - the first imaging device captures an image of the component;
  - the controller identifies a first reference alignment feature of the component from the image captured by the first imaging device;
  - the component holder places the component on top of another component in the assembly zone based on the identified first reference alignment feature of the component;
  - the second imaging device captures an overhead image of the component on top of the other component;
  - the controller identifies a second reference alignment feature of the component from the image captured by the second imaging device;
  - the controller validates a position of the component in the assembly zone based on the identified second reference alignment feature of the component.

The coordination of the component holder and the first and second imaging devices by the controller enables the apparatus of the invention to carry out an assembly operation that includes both position alignment and position validation of the stacked components. This is made possible by the provision of the upward-facing first imaging device and the downward-facing second imaging device in the apparatus of the invention. As a result, the axial alignment of the components of the assembled object and the consistency of the assembly process can be assured without requiring operator supervision and intervention. This is not only beneficial for assembling objects with high numbers of components and/or different types of components but also advantageous for an automated assembly operation involving assembly of multiple objects.

It will be understood that the assembly operation is applicable to the assembly of two or more components in sequence. It will be further understood that the position alignment and position validation of the assembly operation may be performed for some or all of the components of the object.

It will be further understood that each imaging device may be any device capable of capturing a still or moving image of an object. A non-limiting example of each imaging device is a camera.

As described above, the assembly operation involves aligning and validating the position of a component on top of another component. The assembly operation may also involve alignment and validation of a position of the first component of the object placed in the assembly zone followed by alignment and validation of a second component on top of the first component. In embodiments of the invention, the controller may be programmed to selectively coordinate the component holder and the first and second imaging devices to carry out the assembly operation for assembling components of the object in which:

- the component holder holds a first component over the first imaging device;
- the first imaging device captures an image of the first component;
- the controller identifies a first reference alignment feature of the first component from the image captured by the first imaging device;
- the component holder places the first component in the assembly zone based on the identified first reference alignment feature of the first component;
- the second imaging device captures an overhead image of the first component in the assembly zone;
- the controller identifies a second reference alignment feature of the first component from the image captured by the second imaging device;
- the controller validates a position of the first component in the assembly zone based on the identified second reference alignment feature of the first component.

In further embodiments of the invention, the controller may be programmed to apply an alignment correction to the placement of a subsequent component in the assembly zone if an offset position of the component in the assembly zone is detected by the controller. Thus, in the event of component misplacement or misalignment, the controller is capable of detecting the offset position of the placed component and making the necessary correction for the placement of the next component, without having to restart the entire assembly operation.

Optionally the controller may be programmed to selectively position and control the second imaging device to capture an overhead image of the assembly zone after each component is placed in the assembly zone, and the controller may be programmed to selectively analyse the overhead images of the assembly zone to measure an axial alignment between stacked components in the assembly zone. In this way the apparatus of the invention is further capable of assessing the alignment between the stacked components as part of a quality check. Preferably each overhead image is captured from the same position and perspective so that the components' positions become absolute to one another from this point of reference.

In still further embodiments of the invention, each reference alignment feature may be a central point of the component. However, it will be appreciated that a different type of reference alignment feature may be used depending on the type, size or shape of the object and the type, size or shape of the component.

The controller may be programmed to selectively assign coordinates to each identified reference alignment feature, and the controller may be programmed to selectively use the coordinates as reference values for component placement and component position validation. The coordinates may be assigned with reference to one or more known or pre-defined reference frames or points associated with one or more parts of the apparatus or with an object external to the apparatus. If the or each reference frame or point is associated with one or more parts of the apparatus, a calibration process may be carried out to confirm and/or adjust the position of the or each part before the assembly operation.

The coordination of the component holder and the first and second imaging devices in the assembly operation may involve movement and repositioning of one, some or all of the component holder and the first and second imaging devices, non-limiting examples of which are described as follows and in this specification.

In a non-limiting embodiment of the invention, the apparatus may further include a movable structure. The movable structure may be, for example, a movable stage. The movable structure may be configured to be movable in one, two or three axes. The apparatus may include an actuator for causing movement of the movable structure. The movement of the movable structure may be automatically or manually controlled.

The first imaging device may be mounted on or attached to the movable structure. The controller may be programmed to selectively actuate the movable structure to position the first imaging device beneath the component holder.

The assembly zone may be mounted on or attached to the movable structure. The controller may be programmed to selectively actuate the movable structure to position the assembly zone beneath the component holder. The controller may be programmed to selectively actuate the movable structure to position the assembly zone beneath the second imaging device.

The apparatus may further include a force actuator for performing a pressing operation to apply a pressing load to a component. The controller may be programmed to selectively actuate the movable structure to position the assembly zone in the vicinity of (e.g. beneath) the force actuator to permit the force actuator to perform the pressing operation. The position alignment and the position validation by the assembly operation ensures that the stacked components are properly aligned prior to the pressing operation, thus reducing material wastage and costs arising from rejection of low-quality pressed stacked components.

The force actuator may be, for example, a crimping actuator for performing a crimping operation.

The apparatus may further include a component storage area, such as a component tray. The component storage area may be mounted on or attached to the movable structure. The controller may be programmed to selectively actuate the movable structure to position the component storage area beneath the component holder.

In embodiments of the invention, the controller may be programmed to selectively perform image processing on the captured image during the reference alignment feature identification. The image processing may employ one or more image processing techniques and functions in order to improve the accuracy and/or speed of the reference alignment feature identification. This is particularly beneficial when the assembly operation is an automated operation. The image processing may include, but is not limited to: image smoothing using a Gaussian blur function; Canny edge detection; and/or feature extraction using a Hough transformation.

The controller may be programmed to perform the image processing on the captured image at a first resolution followed by performing the image processing on the captured image at a second, higher resolution during the reference alignment feature identification. The performance of the image processing on the captured image at the first, lower resolution can be used to identify a target region for the reference alignment feature identification, followed by the performance of the image processing on the identified target region of the captured image at the second, higher resolution to more accurately identify the reference alignment feature and reduce overall image processing time.

The controller may be programmed to perform image analysis on the captured image to detect a defect level of the component. The performance of the image analysis may be integrated into the assembly operation. The ability to detect defects in the component not only improves the quality of the final assembled object but also can reduce material wastage and operating costs, especially for an automated assembly operation.

The image analysis can be performed in different ways to detect a defect level of the component, non-limiting examples of which are described as follows and in this specification. The image analysis may include using the identified reference alignment feature, such as its coordinates, to define a region of the component for analysis. The controller may be programmed to provide an indication when the detected defect level of the component exceeds a pre-defined defect threshold. The pre-defined defect threshold may be an operator-defined defect threshold. The indication may be, but is not limited to, an audio signal, a visual signal, an electronic data entry or a combination thereof.

The pre-defined defect threshold may relate to, but is not limited to, a shape of the defect, a size of the defect, a position of the defect, a colour of the defect and/or a contrast of the defect with respect to its surroundings.

In embodiments of the invention, the controller may be programmed to record and store position data for the component placed in the assembly zone. The stored position data may be used to assist the alignment of a subsequent component placed in the assembly zone, or also may be used in a post-assembly assessment of the quality of the object.

In further embodiments of the invention, the object may be a disc-shaped object, such as a disc-shaped electrochemical cell. A non-limiting example of a disc-shaped electrochemical cell is a coin cell.

The apparatus of the invention may include an electrolyte dosing device that is operable to dispense a controlled dose of electrolyte during the assembly operation so that the stacked construction of the plurality of components contains the dispensed dose of electrolyte.

The component holder may be configured in different ways to temporarily hold a component. For example, the component holder may be configured to, in use, hold the component using vacuum suction.

According to a second aspect of the invention, there is provided a method of performing an assembly operation for assembling components of an object having a stacked construction of a plurality of components, the method comprising the steps of:

- holding the component over a first imaging device positioned to face in an upward direction;
- by the first imaging device, capturing an image of the component;
- identifying a first reference alignment feature of the component from the image captured by the first imaging device;
- placing the component on top of another component in an assembly zone based on the identified first reference alignment feature of the component;
- by a second imaging device positioned to face in a downward direction, capturing an overhead image of the component on top of the other component;
- identifying a second reference alignment feature of the component from the image captured by the second imaging device;
- validating a position of the component in the assembly zone based on the identified second reference alignment feature of the component.

The features and advantages of the first aspect of the invention and its embodiments apply mutatis mutandis to the second aspect of the invention and its embodiments.

The method of the invention may include the steps of:

- holding a first component over the first imaging device;
- by the first imaging device, capturing an image of the first component;
- identifying a first reference alignment feature of the first component from the image captured by the first imaging device;
- placing the first component in the assembly zone based on the identified first reference alignment feature of the first component;
- by the second imaging device, capturing an image of the first component in the assembly zone;
- identifying a second reference alignment feature of the first component from the image captured by the second imaging device;
- validating a position of the first component in the assembly zone based on the identified second reference alignment feature of the first component.

The method of the invention may include the step of applying an alignment correction to the placement of a subsequent component in the assembly zone if an offset position of the component in the assembly zone is detected.

The method of the invention may include the steps of: by the second imaging device, capturing an overhead image of the assembly zone after each component is placed in the assembly zone; and analysing the overhead images of the assembly zone to measure an axial alignment between stacked components in the assembly zone. Preferably each overhead image is captured from the same position and perspective so that the components' positions become absolute to one another from this point of reference.

In the method of the invention, each reference alignment feature may be a central point of the component.

The method of the invention may include the steps of: assigning coordinates to each identified reference alignment feature; and using the coordinates as reference values for component placement and component position validation.

The method of the invention may include the step of providing a movable structure.

When the first imaging device is mounted on or attached to the movable structure, the method of the invention may include the step of actuating the movable structure to position the first imaging device beneath the component holder.

When the assembly zone is mounted on or attached to the movable structure, the method of the invention may include the step of actuating the movable structure to position the assembly zone beneath the component holder.

When the assembly zone is mounted on or attached to the movable structure, the method of the invention may include the step of actuating the movable structure to position the assembly zone beneath the second imaging device.

The method of the invention may include the step of, by a force actuator, performing a pressing operation to apply a pressing load to a component. When the assembly zone is mounted on or attached to the movable structure, the method of the invention may include the step of actuating the movable structure to position the assembly zone in the vicinity of (e.g. beneath) the force actuator to permit the force actuator to perform the pressing operation.

The method of the invention may include the step of providing a component storage area. When the component storage area is mounted on or attached to the movable structure, the method of the invention may include the step of actuating the movable structure to position the component storage area beneath the component holder.

The method of the invention may include the step of performing image processing on the captured image during the reference alignment feature identification. In the method of the invention, the image processing may include, but is not limited to: image smoothing using a Gaussian blur function; Canny edge detection; and/or feature extraction using a Hough transformation. The method of the invention may include the step of performing the image processing on the captured image at a first resolution followed by performing the image processing on the captured image at a second, higher resolution during the reference alignment feature identification.

The method of the invention may include the step of performing image analysis on the captured image to detect a defect level of the component. In the method of the invention, the image analysis may include using the identified reference alignment feature, such as its coordinates, to define a region of the component for analysis. The method of the invention may include the step of providing an indication when the detected defect level of the component exceeds an operator-defined defect threshold.

The method of the invention may include the step of recording and storing position data for the component placed in the assembly zone.

In the method of the invention, the object may be a disc-shaped object, such as a disc-shaped electrochemical cell.

The method of the invention may include the step of dispensing a controlled dose of electrolyte during the assembly operation so that the stacked construction of the plurality of components contains the dispensed dose of electrolyte.

In the method of the invention, the component holder may be configured to, in use, hold the component using vacuum suction.

It will be appreciated that the use of the terms "first" and "second", and the like, in this patent specification is merely intended to help distinguish between similar features and is not intended to indicate the relative importance of one feature over another feature, unless otherwise specified.

Within the scope of this application it is expressly intended that the various aspects, embodiments, examples and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWING

Preferred embodiments of the invention will now be described, by way of non-limiting examples, with reference to the accompanying drawings in which.

The figures are not necessarily to scale, and certain features and certain views of the figures may be shown exaggerated in scale or in schematic form in the interests of clarity and conciseness.

DETAILED DESCRIPTION

The following embodiments of the invention are described with reference to the assembly of an electrochemical coin cell (also known as a coin battery, a watch battery or a button cell) but it will be appreciated that the following description applies mutatis mutandis to the assembly of any object having a stacked construction of a plurality of components, particularly disc-shaped objects.

Electrochemical coin cells are built for research and development of electrochemical energy storage devices. Specifically, new energy storage device materials are evaluated by manufacturing electrochemical coin cells. For example, an electrochemical coin cell may be manufactured by using the new material as the anode and a conventional material as the cathode.

Figure 1:
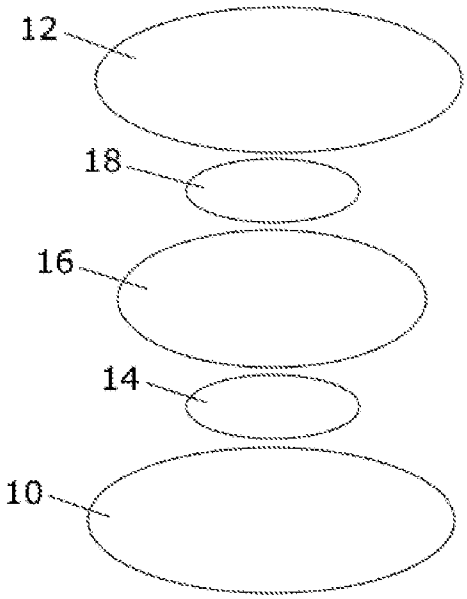
FIG. 1 shows an exploded view of an example of a coin cell.

Typically components of a coin cell include a casing 10,12, an anode 14, a separator 16 and a cathode 18. FIG. 1 shows an example coin cell. The casing 10,12 is usually formed of two casing parts 10,12 that can be attached and sealed to each other to enclose the other components 14,16, 18 of the coin cell. An electrolyte is added inside the casing 10,12 prior to sealing. The electrochemical coin cell may include one or more additional components such as a spring, a spacer, a reference electrode, a gasket and so on.

The electrochemical coin cell may be manufactured by hand or using an automated assembly system. When building the coin cell by hand, the components of the coin cell can be easily misplaced, leading to misalignment of components. In such an event, the coin cell will fail prematurely and thereby exhibit a poor performance that provides misleading information about the new energy storage device material and the testing process. On the other hand, conventional automated systems have limited precision in their ability to place and align the coin cell's components, typically with +/−500 μm deviation in component alignment, especially when one or more components are non-planar, deformed or misshapen.

Figure 2:
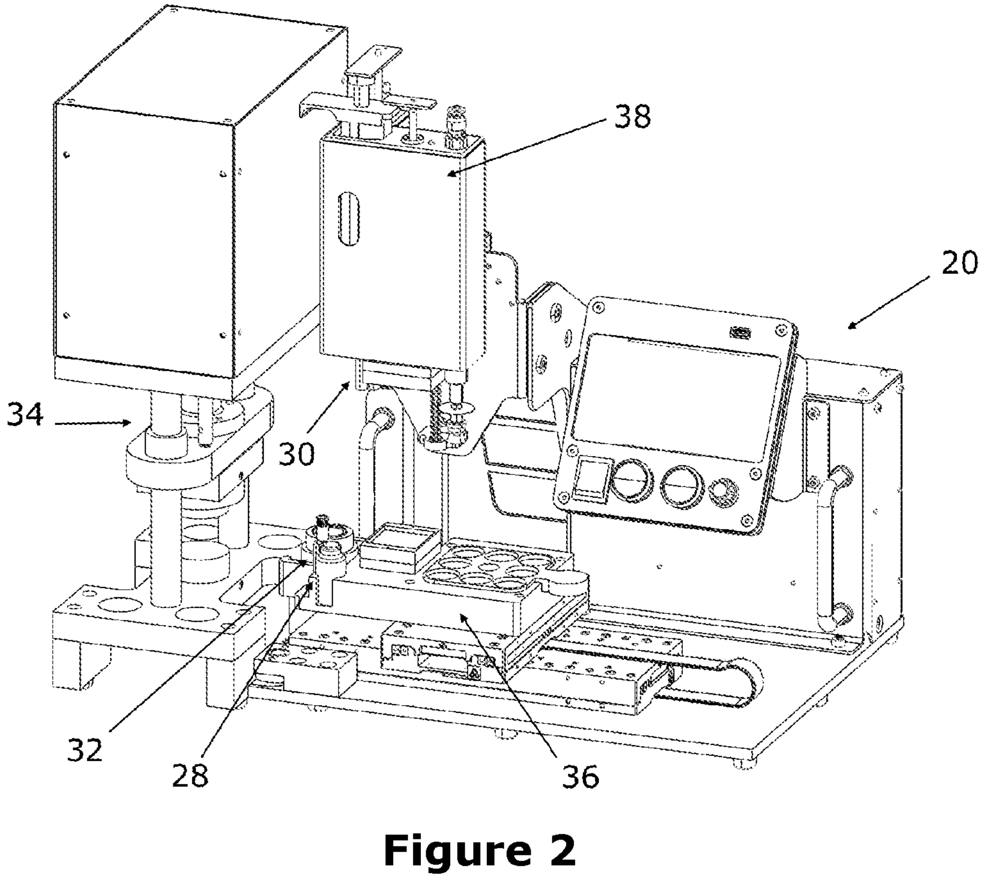
FIG. 2 shows an apparatus according to an embodiment of the invention.
Figure 3A:
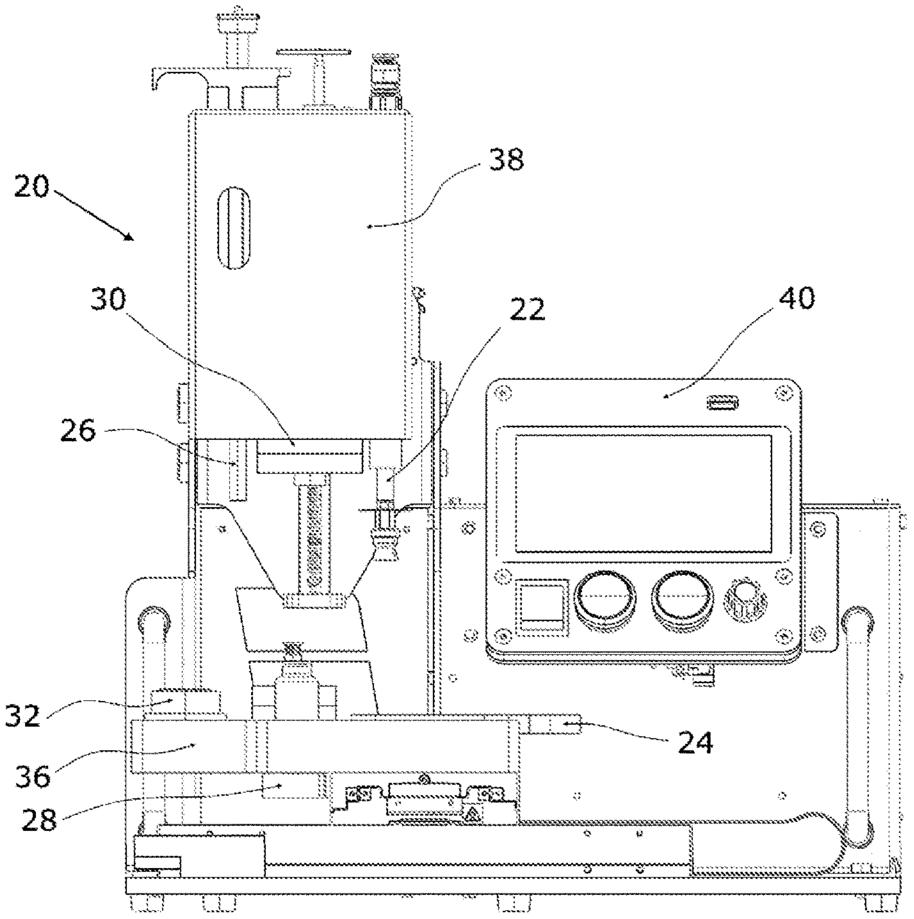
FIGS. 3*a* and 3*b* show front and top views of the apparatus of FIG. 2.
Figure 3B:
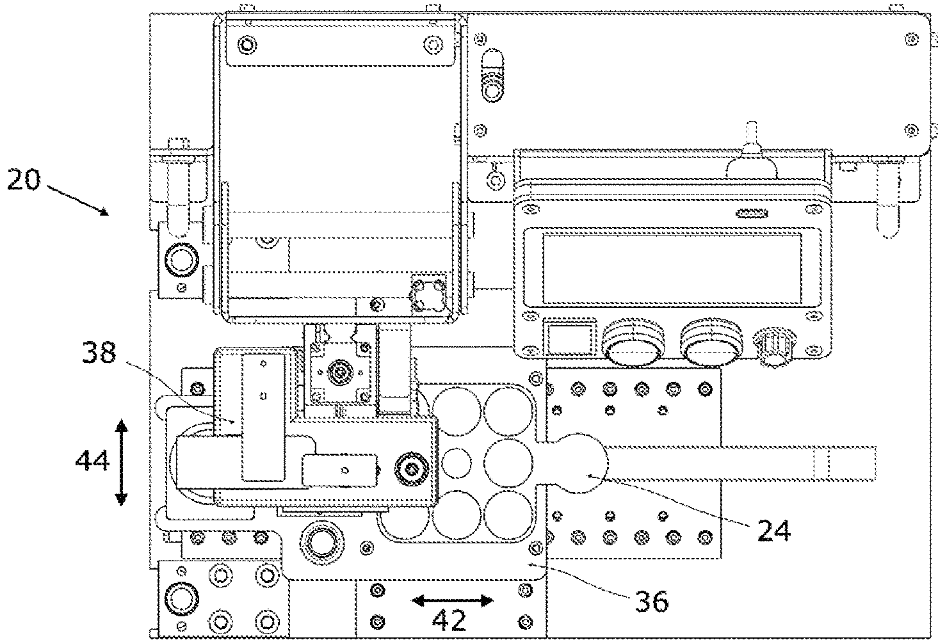

An apparatus according to an embodiment of the invention is shown in FIGS. 2, 3*a* and 3*b* and is designated generally by the reference numeral 20. The apparatus 20 is for stacking a plurality of components to assemble an electrochemical coin cell (referred to hereon as a coin cell).

The apparatus 20 comprises a component holder 22, a component storage area 24, an electrolyte dosing device 26, a first imaging device 28, a second imaging device 30, an assembly zone 32, a sealing device 34, a movable stage 36, a housing 38 and a controller 40.

The component holder 22 is in the form of a vacuum tool 22 for picking up, holding and placing a component using vacuum suction. The vacuum tool 22 may include a vacuum source or may be connected to an external vacuum source. The vacuum tool 22 may be actuatable to move along a vertical axis to perform the picking and placing actions.

The component storage area 24 is in the form of a component tray 24 for storing components of the coin cell. In use, the vacuum tool 22 is operable to pick up a component from the component tray 24.

The electrolyte dosing device 26 is preferably in the form of a pipette 26 but may be any device capable of dispensing a controlled dose of electrolyte. In the embodiment shown, the pipette is configured for manual operation but may be configured for automated operation in other embodiments.

The first and second imaging devices are in the form of first and second cameras 28,30. The first camera 28 is oriented so that its lens is facing an upward direction. The second camera 30 is oriented so that its lens is facing a downward direction.

The assembly zone 32 is in the form of a build pad that defines a build area 32 on which the components may be stacked to assemble the coin cell.

The sealing device 34 is in the form of a crimping actuator for performing a crimping operation by applying a pressing load to the components stacked on the build pad. The crimping actuator may be, for example, a hydraulic press.

The component tray 24, the first camera 28 and the build pad are mounted on the movable stage 36. The stage 36 is actuatable to move in two horizontal axes 42,44 (referred to hereon as the X-axis and Y-axis), where each axis 42,44 is parallel with a surface on which the apparatus 20 rests. In use, the stage 36 is horizontally movable in two axes 42,44 beneath the housing 38 to adjust a position of each of the component tray, the first camera 28 and the build pad relative to the housing 38, and the stage 36 is further movable to position the build pad beneath the crimping actuator.

The pipette, the second camera 30 and the vacuum tool 22 are mounted in the housing 38 that is arranged over the stage 36. The housing 38 is actuatable to move along a vertical axis (referred to hereon as the Z-axis). In use, when the stage 36 is beneath the housing 38, the housing 38 is vertically movable to approach the stage 36 or withdraw from the stage 36.

The controller 40 is programmed to selectively control the actuation of the stage 36 and the housing 38 to move along their respective axes. The actuation of the stage 36 and the housing 38 may be carried out using direct-drive mechanisms, motorised micro-positioning systems or any other positioning system. The controller 40 is also programmed to control operation of the vacuum tool 22 and the first and second cameras 28,30.

The controller 40 may include a processor and memory including computer program code to carry out its functions. The controller 40 may be, may include, may communicate with or may form part of one or more of an electronic device, a portable electronic device, a portable telecommunications device, a microprocessor, a mobile phone, a personal digital assistant, a tablet, a phablet, a desktop computer, a laptop computer, a server, a cloud computing network, a smartphone, a smartwatch, smart eyewear, and a module for one or more of the same. It will be appreciated that references to a memory or a processor may encompass a plurality of memories or processors.

The apparatus 20 of FIG. 2 enables position alignment and position validation of the coin cell's components during the assembly of the coin cell. In particular, the configuration of the parts of the apparatus 20 of FIG. 2 enables comparison and quantification of the positions of the components during the assembly process to ensure that the coin cell's components are aligned, or substantially aligned, to produce a high quality coin cell.

Figure 4:
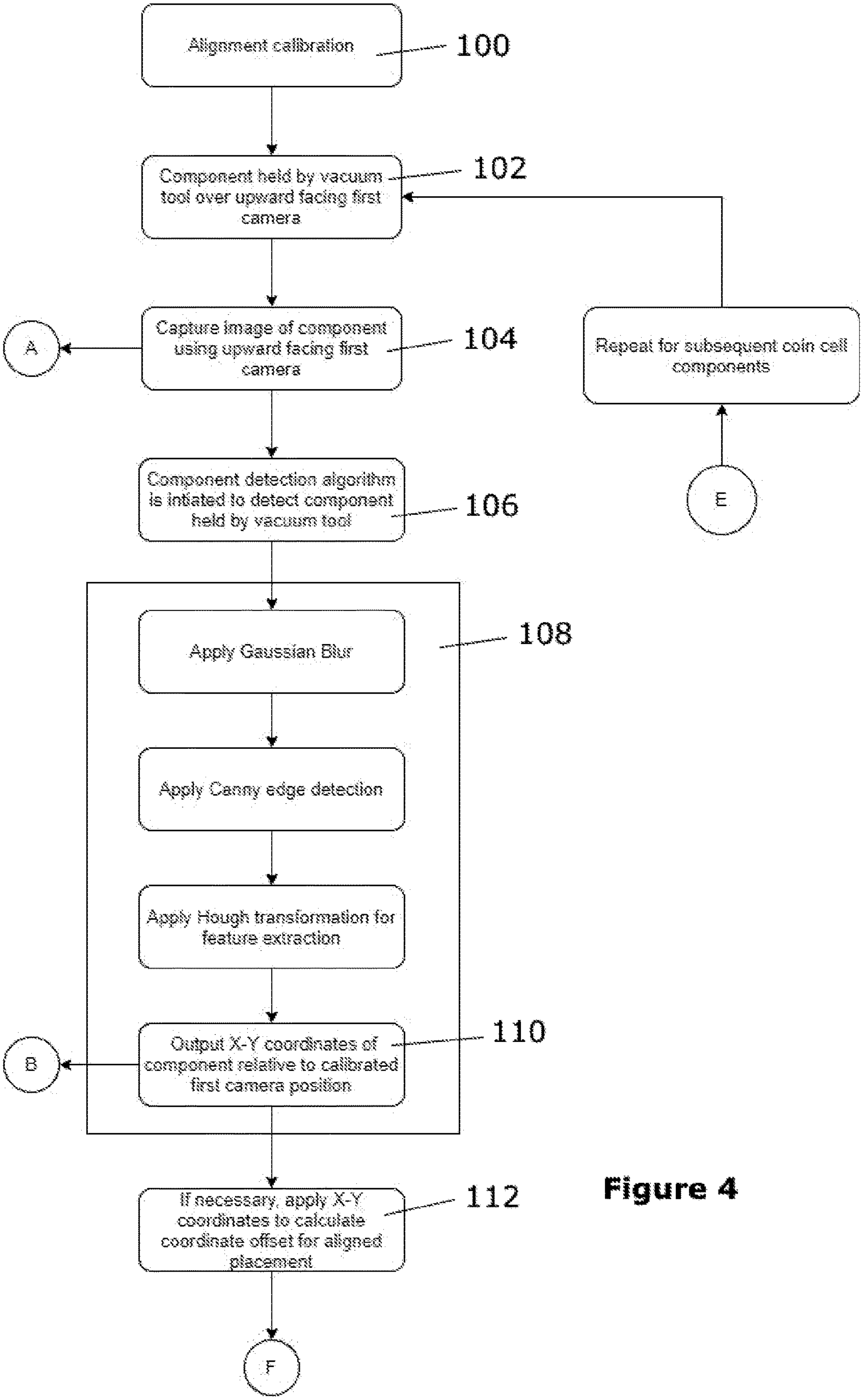
FIG. 4 shows a flowchart illustrating an assembly operation of the apparatus of FIG. 2.

Operation of the apparatus 20 of FIG. 2 to carry out an assembly operation is described as follows with reference to the flow chart of FIG. 4. It will be appreciated that the assembly operation described below and in the flowchart of FIG. 4 is non-limiting. In other embodiments, the assembly operation of the invention may include fewer or more steps within the scope of the claims.

The assembly of the coin cell involves the use of the apparatus 20 to stack the coin cell's components on the build pad, dose an amount of electrolyte into the coin cell using the pipette, and seal the coin cell using the crimping actuator.

As an initial step, an alignment calibration step (Step 100) is carried out to ensure alignment between:

- the first and second cameras 28,30;
- the first camera 28 and the vacuum tool 22 when the first camera 28 is positioned beneath the vacuum tool 22;
- the second camera 30 and the build pad when the build pad is positioned beneath the second camera 30;
- the second camera 30 and the component tray 24 when the component tray 24 is beneath the second camera 30.

The alignment calibration step may be carried out by using the first camera 28 to image the vacuum tool 22, using the second camera 30 to image the build pad and the component tray 24, and using the first and second cameras 28,30 to image each other.

The calibration step is not required to be carried out at the start of each assembly operation. It may be that the calibration step is only carried out after a fixed number of assembly operations is completed, after a fixed period of time has lapsed and/or when a finished coin cell is assessed as not meeting quality requirements. The calibration step may also be carried out following a maintenance or repair of the apparatus 20.

The stage 36 is actuated to position the component tray 24 beneath the vacuum tool 22. The vacuum tool 22 is operated to pick up a first component in the form of a bottom casing part from the component tray 24. The stage 36 is then actuated to position the first camera 28 beneath the vacuum tool 22 so that the first component is held over the first camera 28 in the middle of the object focal plane of the first camera 28 (Step 102). This may require actuation of the housing 38 to move the vacuum tool 22 towards or away from the first camera 28.

The first camera 28 is operated to capture an image of a bottom side of the first component (Step 104). Illumination of the first component may be provided by ambient lighting and/or by a lighting device.

The controller 40 then initiates a component detection algorithm to identify a reference alignment feature of the first component for subsequent placement of the first component on the build pad (Step 106). In this case, the reference alignment feature is the central point of the first component. To identify the central point of the first component, the controller 40 performs image processing on the captured image of the bottom side of the first component by: applying image smoothing using a Gaussian blur; then edge detection using Canny edge detection; and then feature extraction using a Hough transformation (Step 108). The output of the image processing by the controller 40 is the central point of the first component in X-Y coordinates relative to the calibrated position of the first camera 28 (Step 110).

The output X-Y coordinates of the first component from the image processing is then used to position the placement of the first component on the build pad. The controller 40 may apply a coordinate offset correction if it is determined that the output X-Y coordinates of the first component would result in an incorrect placement on the build pad, in which case the placement of the first component on the build pad is carried out using corrected X-Y coordinates (Step 112). The output X-Y coordinates (or the corrected X-Y coordinates as the case may be) is used by the controller 40 to control the actuation of the stage 36 to position the stage 36 beneath the vacuum tool 22 in order to place the first component in a target position on the build pad, preferably with the central point of the first component aligned with a central position on the build pad (Step 114).

After the placement of the first component, the stage 36 is then actuated to be positioned directly beneath the second camera 30 so that the first component is located beneath the second camera 30 in the middle of the object focal plane of the second camera 30 (Step 116). This may require actuation of the housing 38 to move the second camera 30 towards or away from the build pad.

The second camera 30 is operated to capture an image of a top side of the first component (Step 118). Illumination of the first component may be provided by ambient lighting and/or by a lighting device.

The controller 40 then initiates a component detection algorithm to identify a reference alignment feature, namely the central point, of the first component placed on the build pad (Step 120). To identify the central point of the first component, the controller 40 performs image processing on the captured image of the top side of the first component by: applying image smoothing using a Gaussian blur; then edge detection using Canny edge detection; and then feature extraction using a Hough transformation (Step 122). The output of the image processing by the controller 40 is the central point of the first component in X-Y coordinates relative to the calibrated position of the second camera 30 (Step 124).

Optionally, during the central point identification by the controller 40, the image processing may be carried out on the captured image at low resolution to first identify a target region for identifying the central point, followed by image processing on the identified target region of the captured image at high resolution to pinpoint the location of the central point. This has the effect of improving the accuracy and speed of the central point identification.

After the first component is placed on the build pad, additional components are then stacked on top of the first component one at a time by repeating Steps 102 to 124, which is described as follows.

The stage 36 is actuated to position the component tray 24 beneath the vacuum tool 22. The vacuum tool 22 is operated to pick up a second component in the form of an anode from the component tray 24. The stage 36 is then actuated to position the first camera 28 beneath the vacuum tool 22 so that the second component is held over the first camera 28 in the middle of the object focal plane of the first camera 28 (Step 102). This may require actuation of the housing 38 to move the vacuum tool 22 towards or away from the first camera 28.

The first camera 28 is operated to capture an image of a bottom side of the second component (Step 104). Illumination of the second component may be provided by ambient lighting and/or by a lighting device.

The controller 40 then initiates a component detection algorithm to identify a reference alignment feature of the second component for subsequent placement of the second component on the build pad (Step 106). In this case, the reference alignment feature is the central point of the second component. To identify the central point of the second component, the controller 40 performs image processing on the captured image of the bottom side of the second component by: applying image smoothing using a Gaussian blur; then edge detection using Canny edge detection; and then feature extraction using a Hough transformation (Step 108). The output of the image processing by the controller 40 is the central point of the second component in X-Y coordinates relative to the calibrated position of the first camera 28 (Step 110).

The output X-Y coordinates of the second component from the image processing is then used to position the placement of the second component on the build pad. The controller 40 may apply a coordinate offset correction if it is determined that the output X-Y coordinates of the second component would result in an incorrect placement on the build pad, in which case the placement of the second component on the build pad is carried out using corrected X-Y coordinates (Step 112). The output X-Y coordinates (or the corrected X-Y coordinates as the case may be) is used by the controller 40 to control the actuation of the stage 36 to position the stage 36 beneath the vacuum tool 22 in order to place the second component in a target position on the first component in the build area 32, preferably with the central point of the second component aligned with a central position of the build pad and the central point of the first component (Step 114).

After the placement of the second component, the stage 36 is then actuated to be positioned directly beneath the second camera 30 so that the second component is located beneath the second camera 30 in the middle of the object focal plane of the second camera 30 (Step 116). This may require actuation of the housing 38 to move the second camera 30 towards or away from the build pad.

The second camera 30 is operated to capture an image of a top side of the second component (Step 118). Illumination of the second component may be provided by ambient lighting and/or by a lighting device.

The controller 40 then initiates a component detection algorithm to identify a reference alignment feature, namely the central point, of the second component placed on the build pad (Step 120). To identify the central point of the second component, the controller 40 performs image processing on the captured image of the top side of the second component by: applying image smoothing using a Gaussian blur; then edge detection using Canny edge detection; and then feature extraction using a Hough transformation (Step 122). The output of the image processing by the controller 40 is the central point of the second component in X-Y coordinates relative to the calibrated position of the second camera 30 (Step 124).

The above Steps 102 to 124 may be repeated for stacking further components on the anode and the bottom casing part already placed on the build pad.

The electrolyte is added into the coin cell at some point during the assembly operation before the top casing part is added to the stack of components. The addition of the electrolyte into the coin cell is carried out by actuating the stage 36 to position the build pad beneath the pipette and adding a controlled dose of electrolyte to the stack of components on the build pad.

The manufacture of the coin cell is completed by actuating the stage 36 to position the build pad beneath the hydraulic press so that the hydraulic press may apply a pressing load to the stacked components to perform a crimping and sealing operation in order to produce the coin cell.

The assembly operation may additionally include a position compensation step to eliminate or minimise misalignment between the components. Specifically, the controller 40 may be programmed to apply an alignment correction to the placement of a subsequent component in the build area 32 if an offset position of the component on the build pad is detected by the controller 40.

The assembly operation may include an optional image analysis step by the controller 40 to assess coating quality of a selected component, such as coating uniformity. This may include the controller 40 performing brightness analysis of the captured images of the selected component.

During the assembly operation, after all of the coin cell components are stacked on the build pad, the controller 40 carries out a validation of a position of each component in the build area 32 based on the identified central point of each component (Step 126). The validation process may include measuring the axial alignment between the components. During the assembly operation, overhead images of the build pad are captured by the second camera 30 after each component is placed in the build pad. Since the overhead images are captured from the same position and perspective, it becomes possible for the controller 40 to analyse the overhead images to measure a distance between the stacked components in the X-Y plane. This may be used to quantify the axial alignment between the stacked components as part of a build quality analysis and validation process. The axial alignment measurement is preferably based on the distance between the central points of the components.

During the assembly operation, the controller 40 may record and store information for the assembled coin cell (Step 128). The stored information may include position data for each component placed in the build area 32. The stored position data may be used to assist the alignment of a subsequent component placed in the build area 32, or also may be used in a post-assembly assessment of the quality of the object. The stored position data may include the output X-Y coordinates of each component and/or the axial alignment data from the position validation process. The position data may be used as a variable metric for subsequent evaluation of the performance of the coin cell.

The inventor has found that the assembly operation carried out by the apparatus 20 of FIG. 2 enables consistent axial alignment between components with a separation of less than 20 μm in comparison to conventional assembly operations that produce axial alignment between components with a separation of greater than 500 μm. Coin cells with poor axial alignment, i.e. a separation of greater than 500 microns, lead to premature cell failure. On the other hand coin cells with good axial alignment, i.e. a separation of less than 20 microns, lead to long-lasting cells.

Preferably good axial alignment is achieved between all of the stacked components. However, to meet manufacturing requirements, the controller 40 may be programmed to prioritise axial alignment between certain components of the coin cell. In order of priority from highest to lowest, the controller 40 may be programmed to prioritise the axial alignment of the anode and the cathode, followed by the separator, and finally followed by the other coin cell components.

The configuration of the apparatus 20 of the invention therefore enables an automated coin cell production system to accurately place coin cell components, validate their placement and quantify their axial alignment. This in turn enables the invention to address the problems of: accurately building electrochemical cells with misshapen components (e.g. wavy or curved electrodes); accurately placing misshapen components (e.g. wavy or curved electrodes) with the highest degree of axial alignment; and quantifying the axial alignment between components. Furthermore, the component alignment facilitated by the assembly operation and the stored position data for the coin cell enables a user to evaluate the performance of the electrodes and cell components (e.g. separator and casing) for electrochemical cells with:

- more consistent results;
- results that more accurately reflect the optimal performance of the cell configuration;
- validation of component alignment in cell configuration.

Figure 5:
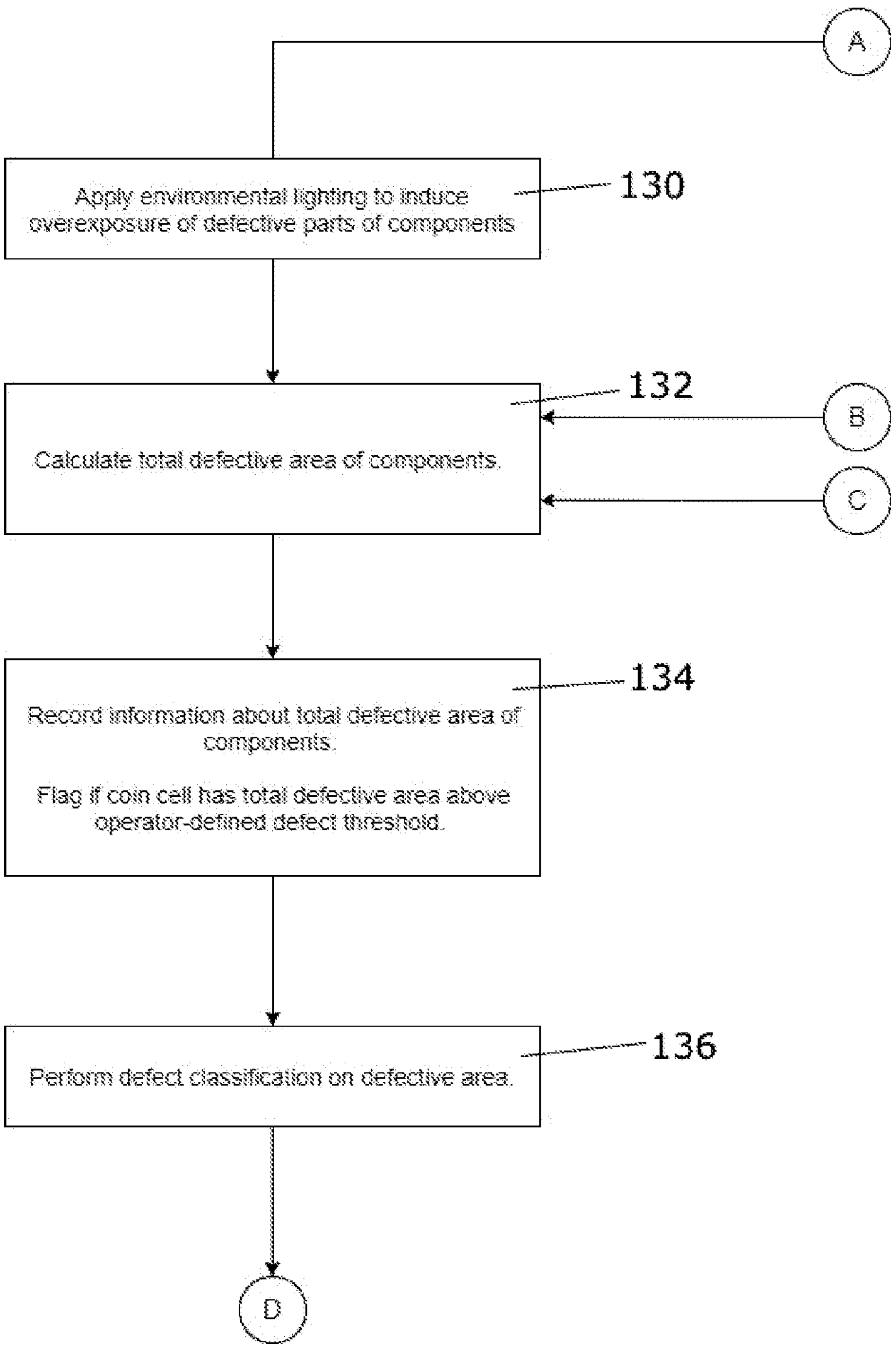
FIG. 5 shows a flowchart illustrating a defect detection process of the assembly operation of FIG. 4.

An optional defect detection process involving image analysis by the controller 40 may be integrated into the assembly operation. An example defect detection process for each component is described as follows with reference to FIG. 5.

After Step 104, environmental lighting is applied using a lighting device to induce overexposure of defective parts of the component (Step 130).

The total defective area of the component is then calculated as follows, using the captured images from the first and second cameras 28,30 and using output X-Y coordinates of the central point relative to the calibrated positions of the first and second cameras 28,30 (Step 132):

- Extreme coordinate transformation is used to isolate the component.
- A polar warping function is applied to convert a radial image to a linearised image in order to remove an outer area. A reverse polar warping function is then applied to convert the linearised image back to a radial image that now omits non-essential background information.
- Binary threshold analysis is applied to the image of the isolated component to further isolate overexposed defective areas.
- Contour detection is applied to the isolated overexposed defective areas.
- The total defective area of the component is quantified by evaluating contour chain length and chain quantity.

The calculated total defective area of the component is then recorded, and the controller 40 provides an indication in the form of a flag if the total defective area exceeds an operator-defined defect threshold (Step 134). The provision of the upward-facing first camera 28 and the downward-facing second camera 30 enables a more complete defect evaluation of the coin cell and its components, particularly the top and bottom sides of the anode and the cathode.

The nature of the defect is classified using, for example, defective area shape detection from contour data in combination with defect radial position and radial boxing (Step 136). Non-limiting examples of component defects include; a cracked component; a bent component; a folded component; an incomplete component; and a torn component. An incomplete component has one or more missing component sections in comparison to a complete component. The defect data is then stored as part of the stored information for the assembled coin cell (Step 128).

The listing or discussion of an apparently prior published document or apparently prior published information in this specification should not necessarily be taken as an acknowledgement that the document or information is part of the state of the art or is common general knowledge.

Preferences and options for a given aspect, feature or parameter of the invention should, unless the context indicates otherwise, be regarded as having been disclosed in combination with any and all preferences and options for all other aspects, features and parameters of the invention.

The invention claimed is:

1. An apparatus for assembling an object having a stacked construction of a plurality of components, the apparatus comprising:

- a component holder for selectively holding and placing a component;
- an assembly zone in which the object may be assembled;
- first and second imaging devices, the first imaging device positioned to face in an upward direction, the second imaging device positioned to face in a downward direction; and
- a controller programmed to selectively coordinate the component holder and the first and second imaging devices to carry out an assembly operation for assembling components of the object in which:
  - the component holder holds a component over the first imaging device;
  - the first imaging device captures an image of the component;
  - the controller identifies a first reference alignment feature of the component from the image captured by the first imaging device;
  - the component holder places the component on top of another component in the assembly zone based on the identified first reference alignment feature of the component;
  - the second imaging device captures an overhead image of the component on top of the other component;
  - the controller identifies a second reference alignment feature of the component from the image captured by the second imaging device;
  - the controller validates a position of the component in the assembly zone based on the identified second reference alignment feature of the component.

2. An apparatus according to claim 1 wherein the controller is programmed to selectively coordinate the component holder and the first and second imaging devices to carry out the assembly operation for assembling components of the object in which:

- the component holder holds a first component of the components of the object over the first imaging device;

the first imaging device captures an image of the first component;

the controller identifies a first reference alignment feature of the first component from the image captured by the first imaging device;

the component holder places the first component in the assembly zone based on the identified first reference alignment feature of the first component;

the second imaging device captures an overhead image of the first component in the assembly zone;

the controller identifies a second reference alignment feature of the first component from the image captured by the second imaging device;

the controller validates a position of the first component in the assembly zone based on the identified second reference alignment feature of the first component.

3. An apparatus according to claim 1 wherein the controller is programmed to apply an alignment correction to the placement of a subsequent component in the assembly zone if an offset position of the component in the assembly zone is detected by the controller.

4. An apparatus according to claim 1 wherein the controller is programmed to selectively position and control the second imaging device to capture an overhead image of the assembly zone after each component is placed in the assembly zone, and wherein the controller is programmed to selectively analyze the overhead images of the assembly zone to measure an axial alignment between stacked components in the assembly zone.

5. An apparatus according to claim 1 wherein each reference alignment feature is a central point of the component.

6. An apparatus according to claim 1 wherein the controller is programmed to selectively assign coordinates to each identified reference alignment feature, and wherein the controller is programmed to selectively use the coordinates as reference values for component placement and component position validation.

7. An apparatus according to claim 1 further including a movable structure, the first imaging device mounted on or attached to the movable structure, wherein the controller is programmed to selectively actuate the movable structure to position the first imaging device beneath the component holder.

8. An apparatus according to claim 1 further including a movable structure, the assembly zone mounted on or attached to the movable structure, wherein the controller is programmed to selectively actuate the movable structure to position the assembly zone beneath the component holder.

9. An apparatus according to claim 1 further including a movable structure, the assembly zone mounted on or attached to the movable structure, wherein the controller is programmed to selectively actuate the movable structure to position the assembly zone beneath the second imaging device.

10. An apparatus according to claim 1 further including a movable structure and a force actuator, the assembly zone mounted on or attached to the movable structure, the force actuator for performing a pressing operation to apply a pressing load to a component, wherein the controller is programmed to selectively actuate the movable structure to position the assembly zone in the vicinity of the force actuator to permit the force actuator to perform the pressing operation.

11. An apparatus according to claim 1 further including a movable structure and a component storage area, the component storage area mounted on or attached to the movable structure, wherein the controller is programmed to selectively actuate the movable structure to position the component storage area beneath the component holder.

12. An apparatus according to claim 1 wherein the controller is programmed to selectively perform image processing on the captured image during the reference alignment feature identification.

13. An apparatus according to claim 12 wherein the image processing includes image smoothing using at least one of: a Gaussian blur function; Canny edge detection;

and feature extraction using a Hough transformation.

14. An apparatus according to claim 12 wherein the controller is programmed to perform the image processing on the captured image at a first resolution followed by performing the image processing on the captured image at a second, higher resolution during the reference alignment feature identification.

15. An apparatus according to claim 1 wherein the controller is programmed to perform image analysis on the captured image to detect a defect level of the component.

16. An apparatus according to claim 15 wherein the image analysis includes using the identified reference alignment feature to define a region of the component for analysis.

17. An apparatus according to claim 16 wherein the controller is programmed to selectively assign coordinates to each identified reference alignment feature, and wherein the controller is programmed to selectively use the coordinates as reference values for component placement and component position validation, wherein the image analysis includes using the coordinates of the identified reference alignment feature to define the region of the component for analysis.

18. An apparatus according to claim 15 wherein the controller is programmed to provide an indication when the detected defect level of the component exceeds a pre-defined defect threshold.

19. An apparatus according to claim 1 wherein the object is a disc-shaped electrochemical cell.

20. A method of performing an assembly operation for assembling components of an object having a stacked construction of a plurality of components, the method comprising the steps of:

holding a component over a first imaging device positioned to face in an upward direction;

by the first imaging device, capturing an image of the component;

identifying a first reference alignment feature of the component from the image captured by the first imaging device;

placing the component on top of another component in an assembly zone based on the identified first reference alignment feature of the component;

by a second imaging device positioned to face in a downward direction, capturing an overhead image of the component on top of the other component;

identifying a second reference alignment feature of the component from the image captured by the second imaging device;

validating a position of the component in the assembly zone based on the identified second reference alignment feature of the component.

* * * * *